US012592182B2

(12) United States Patent
Zhang

(10) Patent No.: US 12,592,182 B2
(45) Date of Patent: Mar. 31, 2026

(54) METHOD, SYSTEM, DEVICE, APPARATUS AND MEDIUM FOR DRIVING LED DISPLAY SCREEN

(71) Applicant: Chipone Technology (Beijing) Co., Ltd., Beijing (CN)

(72) Inventor: Hao Zhang, Beijing (CN)

(73) Assignee: Chipone Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 18/878,868

(22) PCT Filed: Jun. 21, 2023

(86) PCT No.: PCT/CN2023/101556

§ 371 (c)(1),
(2) Date: Dec. 24, 2024

(87) PCT Pub. No.: WO2023/246828

PCT Pub. Date: Dec. 28, 2023

(65) Prior Publication Data

US 2026/0004706 A1 Jan. 1, 2026

(30) Foreign Application Priority Data

Jun. 24, 2022 (CN) ......................... 202210730351.2

(51) Int. Cl.
*G09G 3/32* (2016.01)
*G09G 3/20* (2006.01)

(52) U.S. Cl.
CPC ............. *G09G 3/32* (2013.01); *G09G 3/2003* (2013.01); *G09G 2300/0814* (2013.01); (Continued)

(58) Field of Classification Search
None
See application file for complete search history.

(56) References Cited

U.S. PATENT DOCUMENTS

2011/0074799 A1* 3/2011 Wu ...................... G09G 3/2025 345/532
2016/0019829 A1* 1/2016 Li ............................ G09G 3/32 345/83

(Continued)

FOREIGN PATENT DOCUMENTS

CN 101004886 A 7/2007
CN 102714005 A 10/2012

(Continued)

*Primary Examiner* — Christopher J Kohlman
(74) *Attorney, Agent, or Firm* — Treasure IP group, LLC

(57) ABSTRACT

Disclosed is a method, a system, a device, an apparatus and a medium for driving an LED display screen. When the total grayscale value of an LED lamp bead is greater than a grayscale threshold value, the sub-grayscale value of the LED lamp bead is determined based on a total grayscale value of the LED lamp bead, a total number of sub-frames and a grayscale growth sequence number of each sub-frame image, otherwise, the sub-grayscale value of the LED lamp bead is determined according to the total grayscale value of the LED lamp bead, the grayscale non-dispersion threshold value and the grayscale growth sequence number of each sub-frame image; according to the sub-grayscale value of each LED lamp bead in each sub-frame image, the LED display screen is driven to display each sub-frame image, so that the grayscale value can be uniformly dispersed, and image display quality is improved.

8 Claims, 4 Drawing Sheets

(52) U.S. Cl.
CPC ............... *G09G 2300/0819* (2013.01); *G09G 2320/0233* (2013.01); *G09G 2320/0247* (2013.01)

(56) References Cited

U.S. PATENT DOCUMENTS

| | | | | |
|---|---|---|---|---|
| 2016/0027385 | A1* | 1/2016 | Li | G09G 3/32 345/82 |
| 2019/0114971 | A1* | 4/2019 | Choi | G09G 3/3266 |
| 2019/0311673 | A1* | 10/2019 | Li | G09G 3/3208 |
| 2020/0184881 | A1* | 6/2020 | Li | G09G 3/2014 |

FOREIGN PATENT DOCUMENTS

| | | | |
|---|---|---|---|
| CN | 104637449 | A | 5/2015 |
| CN | 105590588 | A | 5/2016 |
| CN | 111161164 | A | 5/2020 |
| CN | 112037710 | A | 12/2020 |
| CN | 112614473 | A | 4/2021 |
| CN | 112835830 | A | 5/2021 |
| CN | 113436574 | A | 9/2021 |
| CN | 115050314 | A | 9/2022 |
| JP | H1152912 | A | 2/1999 |
| JP | 2007265055 | A | 10/2007 |
| KR | 20030076030 | A | 7/2003 |

* cited by examiner

METHOD, SYSTEM, DEVICE, APPARATUS AND MEDIUM FOR DRIVING LED DISPLAY SCREEN

CROSS-REFERENCE TO RELATED APPLICATION

This application is a Section 371 National Stage Application No. PCT/CN2023/101556, filed on 21 Jun. 2023, entitled "METHOD, SYSTEM, DEVICE, APPARATUS AND MEDIUM FOR DRIVING LED DISPLAY SCREEN", which published as WO2023246828A1, 28 Dec. 2023, and claims priority to Chinese invention patent application No. 202210730351.2 filed on Jun. 24, 2022, entitled "METHOD, SYSTEM, DEVICE, APPARATUS AND MEDIUM FOR DRIVING LED DISPLAY SCREEN", the entire contents of which are incorporated herein by reference, including the full texts of the specifications, claims, drawings and abstracts.

TECHNICAL FIELD

The present application relates to a technical field of LED display, in particular to a method, a system, a device, an apparatus, and a medium for an LED display screen.

BACKGROUND

Currently, a system for driving a light emitting diode (LED) display screen commonly employs scrambled pulse wide modulation (SPWM) technique to control each LED lamp bead in the LED display screen, so as to make the LED display screen be able to display corresponding frame images. The technical principle involves dispersing the conduction time for a one-frame image into several shorter conduction periods which are uniformly distributed across several sub-frame images, so as to increase the visual refreshing rate of the LED display screen, following steps may be taken in an implementation process: firstly, the time for displaying a one-frame image is evenly allocated to N sub-frame images; then, the grayscale value of each LED lamp bead in the LED display screen corresponding to that one-frame image is evenly divided into N parts which are respectively dispersed to the N sub-frame images; finally, for each sub-frame image, the on-time for lighting each LED lamp bead in the LED display screen corresponds to the time allocated to the grayscale value dispersed to that sub-frame image.

Generally, in the system for driving the LED display screen, on the basis of the SPWM technique, a non-dispersion mode at low grayscale may also be enabled. That is, a non-dispersion threshold value is firstly preset, then: when the grayscale value is lower than or equal to the non-dispersion threshold value, the grayscale value is only displayed in a certain sub-frame image, and is not displayed in the remaining sub-frame images; when the grayscale value is greater than the non-dispersion threshold value, the grayscale value is firstly allocated to one or several sub-frame images, ensuring that the grayscale value in the one or several sub-frame images is equal to the non-dispersion threshold value, and if there is any remaining grayscale value after allocating to the one or several sub-frame images, the remaining grayscale value is then allocated to another sub-frame image. However, in the non-dispersion mode at low grayscale on the basis of the SPWM technique, if the grayscale value of each sub-frame image is unevenly dispersed, the actual visual refreshing rate at low grayscale will be reduced, resulting in a noticeable flicker perceived by human eyes, thereby reducing the display quality of the LED display screen.

SUMMARY OF THE DISCLOSURE

According to the embodiments of the present application, there is provided a method, a system, a device, an apparatus and a medium for driving an LED display screen, which are used to address the issues of abnormal image display and poor image display quality in an existing LED display screen caused by uneven grayscale dispersion among the LED lamp beads in the LED display screen while being compatible with the non-dispersion mode at low grayscale.

The technical solutions provided by the embodiments of this application are as follows:

According to a first aspect, an embodiment of the present application provides a method for driving an LED display screen, wherein the driving method comprises:

for each LED lamp bead in the LED display screen, if it is determined that a total grayscale value of that LED lamp bead in a target frame image is greater than a grayscale threshold value, determining a sub-grayscale value of that LED lamp bead in each sub-frame image of the target frame image according to the total grayscale value of that LED lamp bead in the target frame image, a total number of sub-frames of the target frame image and a grayscale growth sequence number of each sub-frame image of the target frame image; if it is determined that the total grayscale value of that LED lamp bead in the target frame image is not greater than the grayscale threshold value, determining a sub-grayscale value of that LED lamp bead in each sub-frame image of the target frame image according to the total grayscale value of the LED lamp bead in the target frame image, a grayscale non-dispersion threshold value and the grayscale growth sequence number of each sub-frame image of the target frame image, wherein the grayscale growth sequence number of each sub-frame image is a parameter which is determined according to a sub-frame sequence number of that sub-frame image and represents a corresponding grayscale allocation priority of that sub-frame image;

and driving the LED display screen to sequentially display each sub-frame image of the target frame image, according to the sub-grayscale value of each LED lamp bead in the LED display screen corresponding to each sub-frame image of the target frame image.

According to a second aspect, an embodiment of the present application provides a system for driving an LED display screen, wherein the system comprises:

- a memory, configured to store a grayscale non-dispersion threshold value, a total number of sub-frames of a target frame image and a total grayscale value of each LED lamp bead in the LED display screen in the target frame image;
- a sub-frame counter, configured to generate a sub-frame sequence number of each sub-frame image of the target frame image;
- a growth counter, configured to generate a grayscale growth sequence number which represents a grayscale allocation priority and corresponds to each sub-frame image of the target frame image, according to the sub-frame sequence number of each sub-frame image of the target frame image;
- a comparator, configured to respectively compare the total grayscale value of each LED lamp bead in the target frame image stored in the memory with a grayscale threshold value and output a corresponding comparison result for each LED lamp bead;

a selector, configured to select one of the grayscale non-dispersion threshold value and the total number of the sub-frames stored in the memory respectively according to the corresponding comparison result for each LED lamp bead output by the comparator, and output a corresponding selection result for each LED lamp bead;

a processor, configured to determine a sub-grayscale value of each LED lamp bead in each sub-frame image of the target frame image, according to the corresponding selection result for each LED lamp bead output by the selector, the grayscale growth sequence number of each sub-frame image of the target frame image generated by the growth counter, and the total grayscale value of each LED lamp bead in the target frame image stored in the memory; and an SPWM generator, configured to generate an SPWM pulse for each LED lamp bead in each sub-frame image of the target frame image according to the sub-grayscale value of each LED lamp bead in each sub-frame image of the target frame image, so as to drive the LED display screen to sequentially display each sub-frame image of the target frame image.

According to a third aspect, an embodiment of the present application provides a device for driving an LED display screen, wherein the device comprises:

a processor unit, wherein for each LED lamp bead in the LED display screen, if it is determined that a total grayscale value of that LED lamp bead in the target frame image is greater than a grayscale threshold value, the processor unit is configured to determine a sub-grayscale value of that LED lamp bead in each sub-frame image of the target frame image according to the total grayscale value of that LED bead in the target frame image, a total number of sub-frames in the target frame image, and a grayscale growth sequence number of each sub-frame in the target frame image; if it is determined that the total grayscale value of that LED lamp bead in the target frame image is not greater than the grayscale threshold value, the processor unit is configured to determine the sub-grayscale value of that LED lamp bead in each sub-frame image of the target frame image according to the total grayscale value of that LED lamp bead in the target frame image, a grayscale non-dispersion threshold value and the grayscale growth sequence number of each sub-frame image of the target frame image; wherein the grayscale growth sequence number of each sub-frame image is a parameter which is determined according to the sub-frame sequence number of that sub-frame image and represents a grayscale allocation priority of that sub-frame image;

and the driver unit, configured to drive the LED display screen to sequentially display each sub-frame image of the target frame image, according to the sub-grayscale value of each LED lamp bead in the LED display screen in each sub-frame image of the target frame image.

According to a fourth aspect, an embodiment of the present application provides an electronic device, including a memory, a processor, and a computer program which is stored in the memory and executable by the processor, wherein the processor is configured to execute the computer program to implement the driving method for the LED display screen according to the embodiments of the present application.

According to a fifth aspect, an embodiment of the present application also provides a readable storage medium, which is configured to store program instructions, and the driving method for the LED display screen according to the embodiments of the present application can be implemented when the program instructions are executed by a processor.

The embodiments of the present disclosure have following advantages:

According to an embodiment of the present disclosure, for each LED lamp bead in the LED display screen, by selecting the total number of the sub-frames or the grayscale non-dispersion threshold value according to a relationship (e.g., magnitude/size relationship, comparison relationship) between the total grayscale value of that LED lamp bead in the target frame image and the grayscale threshold value, and combining the total grayscale value of that LED lamp bead in the target frame image and the grayscale growth sequence number of each sub-frame image of the target frame image, the sub-grayscale value of that LED lamp bead in each sub-frame image of the target frame image can be calculated, thus, not only uniform dispersion of the total grayscale value of each LED lamp bead in the LED display screen can be achieved, but also the image display quality of the LED display screen can be improved, and the LED display screen can be driven according to an arbitrary total number of sub-frames. Therefore, on one hand, when the image display quality is improved by increasing the visual refreshing rate, a slight increase in the visual refreshing rate can be achieved by increasing the total number of the sub-frames in a small range, that is, the visual refreshing rate can be allowed to vary in finer increments, thereby allowing the grayscale clock frequency to increase in finer increments, minimizing the worsening of coupling phenomena, alleviating the deterioration of low-grayscale display quality, and reducing an increase in power consumption of an LED driver IC (integrated circuit), and further effectively mitigating the issues due to a fact that the image display quality can only be improved by multiplying the visual refreshing rate, which leads to a multiplying increase of the grayscale clock frequency, causing serious coupling phenomenon, poor low-grayscale display quality and multiplying increase in power consumption of the LED driver IC; on the other hand, by adjusting the total number of sub-frames, the frame rate of the LED display screen can be adjusted without a need to reduce the grayscale clock frequency for lowering the frame rate of the LED display screen, thus effectively avoiding the problems that various display parameters of the LED display screen need to be reconfigured and adjusted due to the reduction of the grayscale clock frequency, and the maintenance complexity and the debugging difficulty of the LED display screen can be reduced.

Other features and advantages of the present application will be described in the following description, and in part will be apparent from the description, or may be learned by practice of the present disclosure. Objectives and other advantages of the application may be realized and obtained by means particularly pointed out in the written description, claims, and drawings.

BRIEF DESCRIPTION OF THE DRAWINGS

The accompanying drawings, which are set forth herein to provide a further understanding of the present application, are incorporated in and constitute a part of the present application, and the illustrative embodiments and descriptions thereof are for the purpose of illustrating the present application, and are not intended to unduly limit the present application, wherein.

DETAILED DESCRIPTION OF EMBODIMENTS

Figure 1:
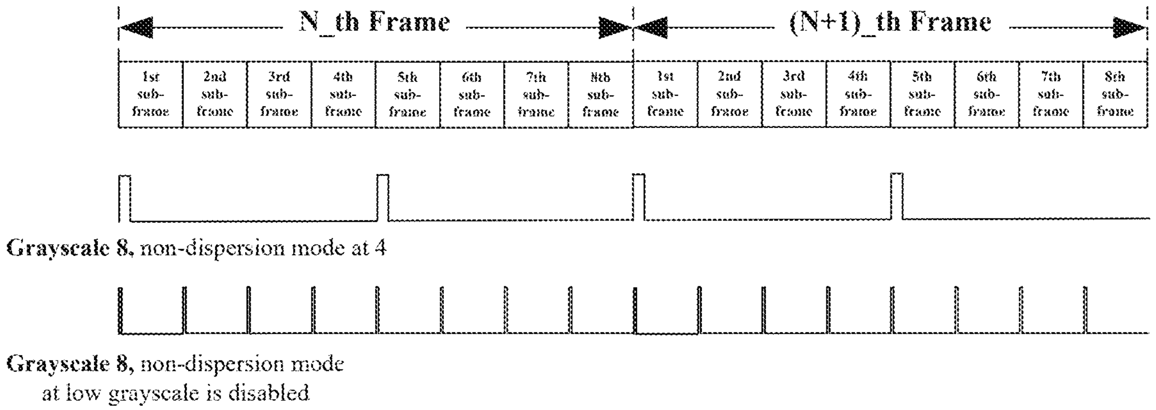
FIG. 1 is a schematic diagram showing a traditional implementation for non-dispersion mode at low grayscale according to an embodiment of the present disclosure.

To make the objectives, technical solutions, and beneficial effects of the present application clearer and more understandable, by combining the drawings corresponding to the embodiments of the present disclosure, a clear and complete description of the technical solutions according to the embodiments of the present application will be provided as follow. It is evident that the described embodiments are merely some of the embodiments of this application and do not encompass all possible embodiments. Based on the embodiments disclosed in the present application, all other embodiments that a person of ordinary skill in the art would obtain without the exercise of inventive labor are encompassed within the scope of protection of this application.

In order for those skilled in the art to better understand the present application, technical terms involved in the present disclosure are briefly introduced below.

Target frame image: an image to be displayed on the LED display screen. For example, the target frame image may be a video image, an advertisement image, a monitoring image, a broadcast image, etc.

Grayscale threshold value: a parameter which is determined according to a grayscale non-dispersion threshold value and a total number of sub-frames and used for being compared with a total grayscale value of an LED lamp bead in the target frame image, so as to determine whether a sub-grayscale value of that LED lamp bead in each sub-frame image of the target frame image can be calculated according to the total number of sub-frames or the grayscale non-dispersion threshold value.

Grayscale growth sequence number: a parameter representing a grayscale allocation priority of each sub-frame image that is determined according to a sub-frame sequence number of that sub-frame image. In an embodiment of the present disclosure, the lower the grayscale growth sequence number, the higher the grayscale allocation priority, and the greater the probability that the sub-grayscale value of the sub-frame image is not 0.

First value: a parameter used when a sequence number increment operation is iteratively performed on the sub-frame sequence number. In an embodiment of the present disclosure, the first value can be, but is not limited to, 1.

Second value: a parameter which is used when the sub-grayscale value of an LED lamp bead in each sub-frame image of the target frame image is determined according to the total grayscale value of that LED lamp bead in the target frame image and the total number of sub-frames of the target frame image. In an embodiment of the present disclosure, the second value may be, but is not limited to, 1.

It should be noted that references to "first", "second", and the like in the present disclosure are used to distinguish between like objects and are not necessarily used to describe a particular order or precedence. It is to be understood that such terms may be interchanged under appropriate circumstances, so that the embodiments described herein may be implemented in other sequences than those illustrated or described herein.

Based on the above-introduced technical terms involved in the present application, the application scenarios and design ideas according to the embodiments of the present application are briefly introduced as follows.

Generally, human eyes have a certain threshold of vision persistence, and when a time interval between two frames displayed by the LED display screen exceeds the threshold of vision persistence, the human eyes will perceive image flickers to a certain extent. To avoid this issue as much as possible, time intervals between adjacent on-time periods of an LED lamp bead should be as identical as possible. A simple example is shown in FIG. 1. Assuming that the total number of sub-frames of the target frame image is 8, the total grayscale value of an LED lamp bead in the LED display screen in the target frame image is 8, when the grayscale non-dispersion threshold value is 4, the sub-grayscale values of the LED lamp bead in the first sub-frame image and the fifth sub-frame image are both 4, and the sub-grayscale values in other sub-frame images are 0; when the non-dispersion mode at low grayscale is not enabled, the sub-grayscale value of the LED lamp bead in each sub-frame image is 1. However, in the SPWM technique, a challenge is how to disperse the total grayscale value of each LED lamp bead in the target frame image as evenly as possible for the sub-frame images of the target frame image. Based on this, the industry has proposed an SPWM technique based on the total number of sub-frames which is a power of 2, while limiting the total number of sub-frames to a power of 2 has the following two disadvantages:

In a case that a frame rate is fixed, if the visual refreshing rate needs to be increased to enhance display quality, the only option is to multiple the total number of sub-frames, which in turn leads to a multiplying increase of the grayscale clock frequency, and eventually lead to serious coupling phenomenon, poor low-grayscale display quality, and increased power consumption of an LED driver IC. For example, if the current frame rate of the LED display screen is 60 Hz and the total number of sub-frames is 64, the current visual refreshing rate is 3840 Hz, and if the visual refreshing rate needs to be increased to enhance the image display quality of the LED display screen, the total number of sub-frames can only be adjusted to 128, so that the visual refreshing rate is increased to 7680 Hz. In this case, the grayscale clock frequency also needs to be doubled, which leads to a deterioration of coupling phenomenon, a deterioration of low-grayscale display quality, and an increase in power consumption of the LED driver IC.

If the frame rate of the LED display screen needs to be adjusted to an expected frame rate, when the current frame rate before an adjustment and the expected frame rate are not related by a power of 2, the adjustment on the frame rate of the LED display screen can only be implemented by adjusting the grayscale clock frequency. For example, if the current frame rate of the LED display screen needs to be adjusted from 60 Hz to 50 Hz, since 50 Hz and 60 Hz are not related by a power of 2, the frame rate cannot be adjusted by adjusting the total number of sub-frames, and the frame rate can only be reduced by reducing the grayscale clock frequency. However, the decrease of the grayscale clock frequency will lead to reconfiguration and adjustment of various display parameters of the LED display screen, which is not conducive to the maintenance and debugging of LED display screen.

For solving the above issues, an embodiment of the present disclosure provides an SPWM technique that allows an arbitrary total number of sub-frames. Specifically, at first, for each LED lamp bead in the LED display screen, if it is determined that the total grayscale value of the LED lamp bead in a target frame image is greater than a grayscale threshold value, a sub-grayscale value of the LED lamp bead in each sub-frame image of the target frame image is determined according to the total grayscale value of the LED lamp bead in the target frame image, the total number of sub-frames of the target frame image and the grayscale growth sequence number of that sub-frame image of the target frame image; if it is determined that the total grayscale value of the LED lamp bead in the target frame image is not greater than the grayscale threshold value, the sub-grayscale value of the LED lamp bead in each sub-frame image of the target frame image is determined according to the total grayscale value of the LED lamp bead in the target frame image, a grayscale non-dispersion threshold value and the grayscale growth sequence number of that sub-frame image of the target frame image; then, the LED display screen is driven to sequentially display each sub-frame image of the target frame image, according to the sub-grayscale value of each LED lamp bead in the LED display screen in that sub-frame image of the target frame image.

In this way, for each LED lamp bead in the LED display screen, by selecting the total number of sub-frames or the grayscale non-dispersion threshold value according to a relationship between the total grayscale value of that LED lamp bead in the target frame image and the grayscale threshold value, and combining the total grayscale value of the LED lamp bead in the target frame image and the grayscale growth sequence number of each sub-frame image of the target frame image, the sub-grayscale value of the LED lamp bead in each sub-frame image of the target frame image can be calculated, thus, not only uniform dispersion of the total grayscale value of each LED lamp bead in the LED display screen can be achieved, but also the image display quality of the LED display screen can be improved, and the LED display screen can be driven according to an arbitrary total number of sub-frames. Therefore, on one hand, when the image display quality is improved by increasing the visual refreshing rate, a slight increase in the visual refreshing rate can be achieved by increasing the total number of the sub-frames in a small range, that is, the visual refreshing rate can be allowed to vary in finer increments, thereby allowing the grayscale clock frequency to increase in finer increments, minimizing the worsening of coupling phenomena, alleviating the deterioration of low-grayscale display quality, and reducing an increase in power consumption of the LED driver IC, and further effectively mitigating the issues due to a fact that the image display quality can only be improved by multiplying the visual refreshing rate, which leads to a multiplying increase of the grayscale clock frequency, causing serious coupling phenomenon, poor low-grayscale display quality and multiplying increase in power consumption of the LED driver IC, for example, if the current frame rate of the LED display screen is 60 Hz and the total number of sub-frames is 64, then the current visual refreshing rate is 3840 Hz, and if the visual refreshing rate needs to be increased to further improve the image display quality, the total number of sub-frames can be adjusted to 65, so that the visual refreshing rate is improved to 3900 Hz, the grayscale clock frequency only needs to be increased by $1/64$ times, and the deterioration of the coupling phenomenon can be furthest reduced compared with the existing solution which can only increase the total number of the sub-frames by the power of 2 times, thus the deterioration of the low-grayscale display quality can be reduced, and the increase in power consumption of the LED driver IC can be reduced; on the other hand, by adjusting the total number of sub-frames, the frame rate of the LED display screen can be adjusted without a need to reduce the grayscale clock frequency for lowering the frame rate of the LED display screen, thus effectively avoiding the problems that various display parameters of the LED display screen need to be reconfigured and adjusted due to the reduction of the grayscale clock frequency, and the maintenance complexity and the debugging difficulty of the LED display screen can be reduced, for example, if the current frame rate of the LED display screen is required to be adjusted from 60 Hz to 50 Hz, it only needs to adjust the current total number of sub-frames to a new total number of sub-frames which is an integer obtained by discarding a decimal part of 1.2 times the original total number of sub-frames, and the frame rate of the LED display screen does not need to be adjusted by adjusting the grayscale clock frequency, therefore, the problem that various display parameters of the LED display screen need to be reconfigured and adjusted due to the decrease of the grayscale clock frequency can be effectively avoided, and the maintenance complexity and debugging difficulty of the LED display screen can be further reduced.

After introducing the application scenarios and design ideas of the embodiments of the present application, the technical solutions provided by the embodiments of the present application are described in detail below.

Figure 2A:
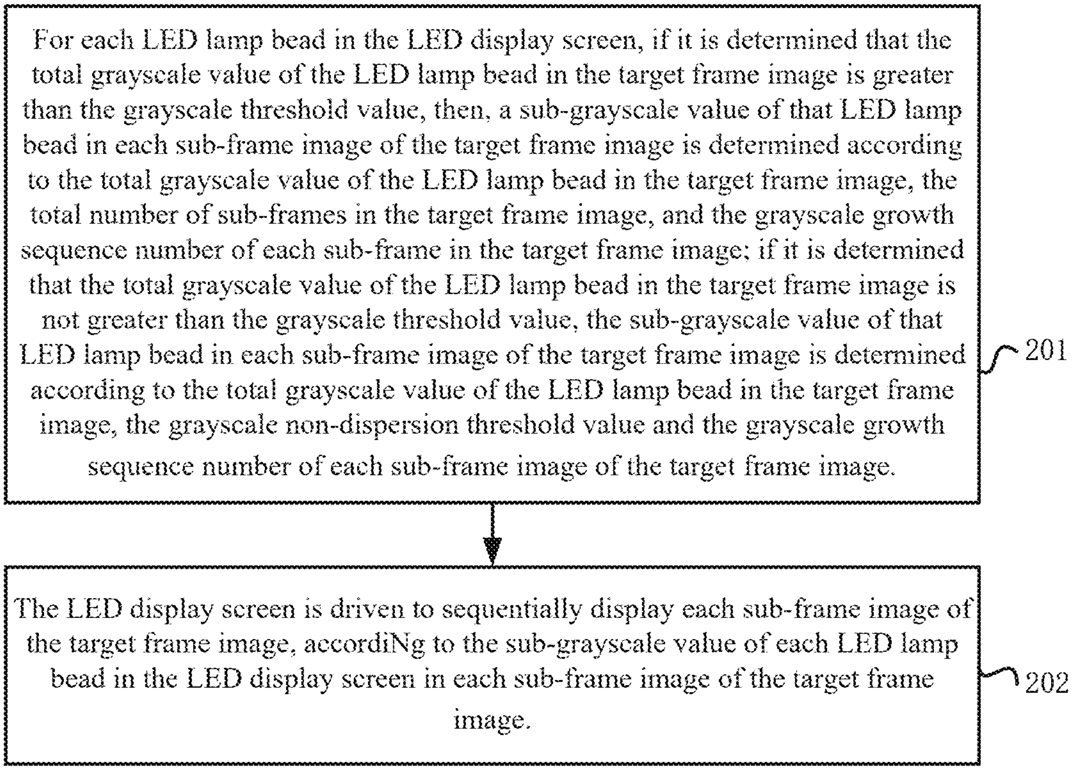
FIG. 2*a* is a flowchart diagram showing a method for driving an LED display screen according to an embodiment of the present disclosure.

According to an embodiment of the present disclosure, a method for driving an LED display screen is provided, and can be applied to an LED driver IC in any type of display screen, such as a light emitting diode display screen, a micro light emitting diode display screen, a mini light emitting diode display screen, a quantum dot light emitting diode display screen and an organic light emitting diode display screen, wherein, the LED driver IC may be a general-purpose driver IC suitable for various display screens, and the general-purpose driver IC is suitable for LED display panels with different LED lamp bead arrangements, so that the design cost and the manufacturing cost can be reduced. Referring to FIG. 2*a*, a general flow of the method for driving the LED display screen according to an embodiment of the present application may be as follows:

In step 201, for each LED lamp bead in the LED display screen, if it is determined that the total grayscale value of the LED lamp bead in the target frame image is greater than the grayscale threshold value, then, a sub-grayscale value of that LED lamp bead in each sub-frame image of the target frame image is determined according to the total grayscale value of the LED lamp bead in the target frame image, the total number of sub-frames in the target frame image, and the grayscale growth sequence number of each sub-frame in the target frame image; if it is determined that the total grayscale value of the LED lamp bead in the target frame image is not greater than the grayscale threshold value, the sub-grayscale value of that LED lamp bead in each sub-frame image of the target frame image is determined according to the total grayscale value of the LED lamp bead in the target frame image, the grayscale non-dispersion threshold value and the grayscale growth sequence number of each sub-frame image of the target frame image.

In a specific implementation, in order to improve the accuracy of the sub-grayscale value of each LED lamp bead in the LED display screen in each sub-frame image of the target frame image, the LED driver IC may determine a product of the grayscale non-dispersion threshold value and the total number of sub-frames as the grayscale threshold value; wherein the total number of sub-frames may be any natural number selected from 1 to 512, the grayscale non-dispersion threshold value may be a natural number greater than 1 when the non-dispersion mode at low grayscale is enabled, and the grayscale non-dispersion threshold value may be equal to 1 when the non-dispersion mode at low grayscale is not enabled. In this way, for each LED lamp bead in the LED display screen, by comparing the sub-grayscale value of the LED lamp bead in each sub-frame image of the target frame image with the grayscale threshold value, and combining the grayscale non-dispersion threshold value or the total number of sub-frames, that is selected according to the comparison result, with the grayscale growth sequence number of each sub-frame image of the target frame image and the total grayscale value of the LED lamp bead in the target frame image, the sub-grayscale value of the LED lamp bead in each sub-frame image of the target frame image can be determined.

In step 202, the LED display screen is driven to sequentially display each sub-frame image of the target frame image, according to the sub-grayscale value of each LED lamp bead in the LED display screen in each sub-frame image of the target frame image.

In a specific implementation, the LED driver IC can generate an SPWM pulse corresponding to an LED lamp bead in each sub-frame image of the target frame image, according to the sub-grayscale value of the LED lamp bead in that sub-frame image of the target frame image, and drive the LED display screen to sequentially display each sub-frame image of the target frame image so as to perform a driving operation on the LED display screen to display the target frame image.

Figure 2B:
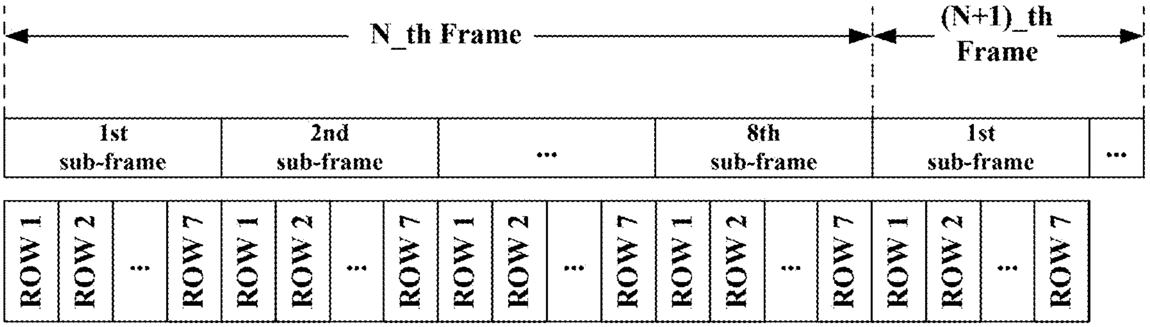
FIG. 2*b* is a schematic diagram showing a driving manner for each sub-frame of a target frame according to an embodiment of the present disclosure.

In a practical application, when the LED driver IC drives the LED display screen to sequentially display the sub-frame images of the target frame image, within each sub-frame image, each row of LED lamp beads are driven to display in accordance with respective sub-grayscale values once in turn, for example, all rows of the first sub-frame image are displayed at first, then all rows of the second sub-frame image are displayed, and so on, and after all sub-frame images have been displayed, a next target frame image is then driven to be displayed. For example, as shown in FIG. 2*b*, the LED display screen includes 7 rows of LED lamp beads, and each target frame image corresponds to 8 sub-frame images; at a beginning of the first sub-frame image, a first row of LED lamp beads are scanned at first, so that each column of LED lamp beads in the first row can be driven according to corresponding sub-grayscale values, and then a second row of LED lamp beads are scanned, so that each column of LED lamp beads in the second row can be driven according to corresponding sub-grayscale values, and so on, until the seventh row of LED lamp beads are scanned for driving each column of LED lamp beads in the seventh row according to corresponding sub-grayscale values, and then the LED lamp beads arranged in the first row of a second sub-frame image are scanned, the LED lamp beads arranged in the second row of the second sub-frame image are scanned, . . . , the LED lamp beads arranged in the seventh row of the second sub-frame image, the LED lamp beads arranged in the first row of a third sub-frame image are scanned, . . . , the LED lamp beads arranged in the seventh row of an eighth sub-frame image are scanned, meaning that the process for displaying the current target frame image is completed, and then a next target frame image continues to be displayed in this way.

In an embodiment of the present disclosure, in order to make the total grayscale value of each LED lamp bead in the LED display screen in the target frame image dispersed evenly as far as possible, before determining the sub-grayscale value of each LED lamp bead in the LED display screen in each sub-frame image of the target frame image, the LED driver IC may also determine the grayscale growth sequence number of each sub-frame image of the target frame image according to the sub-frame sequence number of that sub-frame image of the target frame image. In a specific implementation, for each sub-frame image of the target frame image, the LED driver IC may first perform a high-low bit flip operation on the binary number of the sub-frame sequence number of that sub-frame image to obtain the mirrored sub-frame sequence number of that sub-frame image, and then determine the grayscale growth sequence number of that sub-frame image according to the mirrored sub-frame sequence number of that sub-frame image. Specifically, if it is determined that the mirrored sub-frame sequence number of the sub-frame image is less than the total number of the sub-frames, the mirrored sub-frame sequence number of the sub-frame image can be determined as the grayscale growth sequence number of the sub-frame image; if it is determined that the mirrored sub-frame sequence number of the sub-frame image is not less than the total number of the sub-frames, a sequence number increment operation can be iteratively performed on the sub-frame sequence number of the sub-frame image, until it is determined that the mirrored sub-frame sequence number of an intermediate sub-frame sequence number obtained by performing the sequence number increment operation is less than the total number of the sub-frames, the mirrored sub-frame sequence number of the intermediate sub-frame sequence number obtained from the sequence number increment operation performed for the last time can be determined as the grayscale growth sequence number of the sub-frame image, wherein the sequence number increment operation includes: incrementing by a first value.

For example, it is assumed that the total number of sub-frames of each target frame image is P, where P is an integer greater than 1, the LED driver IC may determine the grayscale growth sequence number of each sub-frame image of the target frame image according to the sub-frame sequence number of each sub-frame image of the target frame image in the following manner:

First, an N-bit growth counter CNT is generated; when the sub-frame sequence number of each sub-frame image of the target frame image is calculated from 0, N is the number of binary digits of M ($M=P-1$). As an example, if $P=5$, then $M=P-1=4$, and M is expressed as '100' in binary, then '1', '0', and '0' each count 1 bit, i.e., M has 3 bits in total, thus N=3. As another example, if P=12, then M=P-1=11, and M is expressed as '1011' in binary, then '1', '0', '1', and '1' each count 1 bit, i.e., M has 4 bits in total, thus N=4. As another example, if P=16, then M=P-1=15, and M is expressed as '1111' in binary, then the four '1's are counted as 1 bit, respectively, i.e., M has 4 bits in total, thus N=4.

Then, a counted value of the growth counter CNT is initialized to 0 and serves as the sub-frame sequence number when the grayscale growth sequence number of a first sub-frame image of the target frame image starts to be calculated, and the counted value of the growth counter CNT is added with 1 and serves as the sub-frame sequence number of a corresponding one of the other sub-frame images when the grayscale growth sequence number of that sub-frame image of the target frame image starts to be calculated.

Further, for each sub-frame image of the target frame image, a high-low bit flip operation is performed on the binary number of the sub-frame sequence number (i.e., the counted value of the growth counter CNT) of the sub-frame image to obtain a mirrored sub-frame sequence number of the sub-frame image. For example, the sub-frame sequence number CNT[N−1:0] of the sub-frame image is 6, corresponding to '110' in binary, and after the high-low bit flip operation, a flipped binary number '011' is obtained and corresponds to 3 in decimal, that is, the mirrored sub-frame sequence number CNT[0:N−1] of the sub-frame image is 3. For another example, the sub-frame sequence number CNT [N−1:0] of the sub-frame image is 14, corresponding to '1110' in binary, and after the high-low bit flip operation, a flipped binary number '0111' is obtained and corresponds to 7 in decimal, that is, the mirrored sub-frame sequence number CNT[0:N−1] of the sub-frame image is 7.

Finally, for each sub-frame image of the target frame image, the mirrored sub-frame sequence number of that sub-frame image is compared with the total number P of the sub-frames, and if it is determined that the mirrored sub-frame sequence number of the sub-frame image is less than the total number P of the sub-frames, the mirrored sub-frame sequence number of the sub-frame image is determined to be the grayscale growth sequence number of the sub-frame image; if it is determined that the mirrored sub-frame sequence number of the sub-frame image is greater than or equal to the total number P of the sub-frames, a sequence number increment operation (for example, incrementing by 1) is iteratively performed on the sub-frame sequence number (i.e., the counted value of the growth counter CNT) of the sub-frame image, until it is determined that the mirrored sub-frame sequence number of an intermediate sub-frame sequence number (i.e., the counted value after a sequence number increment operation implemented by incrementing by 1) is less than the total number P of the sub-frames, the mirrored sub-frame sequence number of the intermediate sub-frame sequence number which is obtained from the sequence number increment operation performed for the last time is determined as the grayscale growth sequence number of the sub-frame image.

Furthermore, after the LED driver IC determines the grayscale growth sequence number of each sub-frame image of the target frame image according to the sub-frame sequence number of that sub-frame image of the target frame image, the sub-grayscale value of each LED lamp bead in the LED display screen in each sub-frame image of the target frame image can be calculated. In a specific implementation, for each LED lamp bead in the LED display screen, the LED driver IC may firstly compare the total grayscale value of that LED lamp bead in the target frame image with the grayscale threshold value; if it is determined that the total grayscale value of that LED lamp bead in the target frame image is greater than the grayscale threshold value, the total grayscale value of that LED lamp bead in the target frame image and the total number of sub-frames of the target frame image may be subjected to a division operation to obtain a first quotient value and a first remainder, and for each sub-frame image of the target frame image, if it is determined that the first remainder is greater than the grayscale growth sequence number of that sub-frame image, the sub-grayscale value of that LED lamp bead in that sub-frame image can be set a sum of the first quotient value and the second value; and if the first remainder is not greater than the grayscale growth sequence number of the sub-frame image, the sub-grayscale value of that LED lamp bead in that sub-frame image can be set to the first quotient value; if it is determined that the total grayscale value of that LED lamp bead in the target frame image is not greater than the grayscale threshold value, the total grayscale value of that LED lamp bead in the target frame image and the grayscale non-dispersion threshold value may be subjected to a division operation to obtain a second quotient value and a second remainder, and for each sub-frame image of the target frame image, if it is determined that the second quotient value is greater than the grayscale growth sequence number of the sub-frame image, the sub-grayscale value of that LED lamp bead in that sub-frame image can be set to the grayscale non-dispersion threshold value; if the second quotient value is determined to be equal to the grayscale growth sequence number of the sub-frame image, the sub-grayscale value of the LED lamp bead in the sub-frame image is set to the second remainder; if the second quotient value is determined to be less than the grayscale growth sequence number of the sub-frame image, the sub-grayscale value of that LED lamp bead in that sub-frame image can be set to 0.

For example, it is assumed that the total number of sub-frames of each target frame is P (P is an integer greater than 1), and the grayscale non-dispersion threshold value is Q, wherein when the non-dispersion mode at low grayscale is not enabled, Q is set to be 1; and when the non-dispersion mode at low grayscale is enabled, Q is set to a value greater than 1, then the LED driver IC, when calculating the sub-grayscale value of each LED lamp bead in the LED display screen in each sub-frame image of the target frame image, may perform, but is not limited to, the following steps:

Step 1: for each LED lamp bead in the LED display screen, determining whether the total grayscale value K of that LED lamp bead in the target frame image is greater than a product of the total number P of the sub-frames and the grayscale non-dispersion threshold value Q or not; and then executing Steps 2A to 3A if K is greater than P*Q, or executing Steps 2B to 3B if K is less than or equal to P*Q.

Step 2A: dividing the total grayscale value K of that LED lamp bead in the target frame image by the total number P of the sub-frames to obtain the first quotient value J and the first remainder L.

Step 3A: for each sub-frame image of the target frame image, determining a relationship between the first remainder L and the grayscale growth sequence number CNT[0:N−1] of that sub-frame image, and if K>CNT[0:N−1], setting the sub-grayscale value of that LED lamp bead in that sub-frame image to the second value which is a sum of 1 and the first quotient value J; if K≤CNT[0:N−1], setting the sub-grayscale value of that LED lamp bead in that sub-frame image to the first quotient value J.

Step 2B: dividing the total grayscale value K of the LED lamp bead in the target frame image by the grayscale non-dispersion threshold value Q to obtain the second quotient value S and the second remainder T.

Step 3B, for each sub-frame image of the target frame image, determining the relationship between the second quotient value S and the grayscale growth sequence number CNT[0:N−1] of that sub-frame image, and if S is greater than CNT[0:N−1], determining the sub-grayscale value of the LED lamp bead in that sub-frame image to be equal to the grayscale non-dispersion threshold value Q; if S=CNT[0:N−1], setting the sub-grayscale value of the LED lamp bead in that sub-frame image to the second remainder T; and if S is less than CNT[0:N−1], setting the sub-grayscale value of the LED lamp bead in that sub-frame image to 0, meaning no display by the LED lamp bead.

Figure 3A:
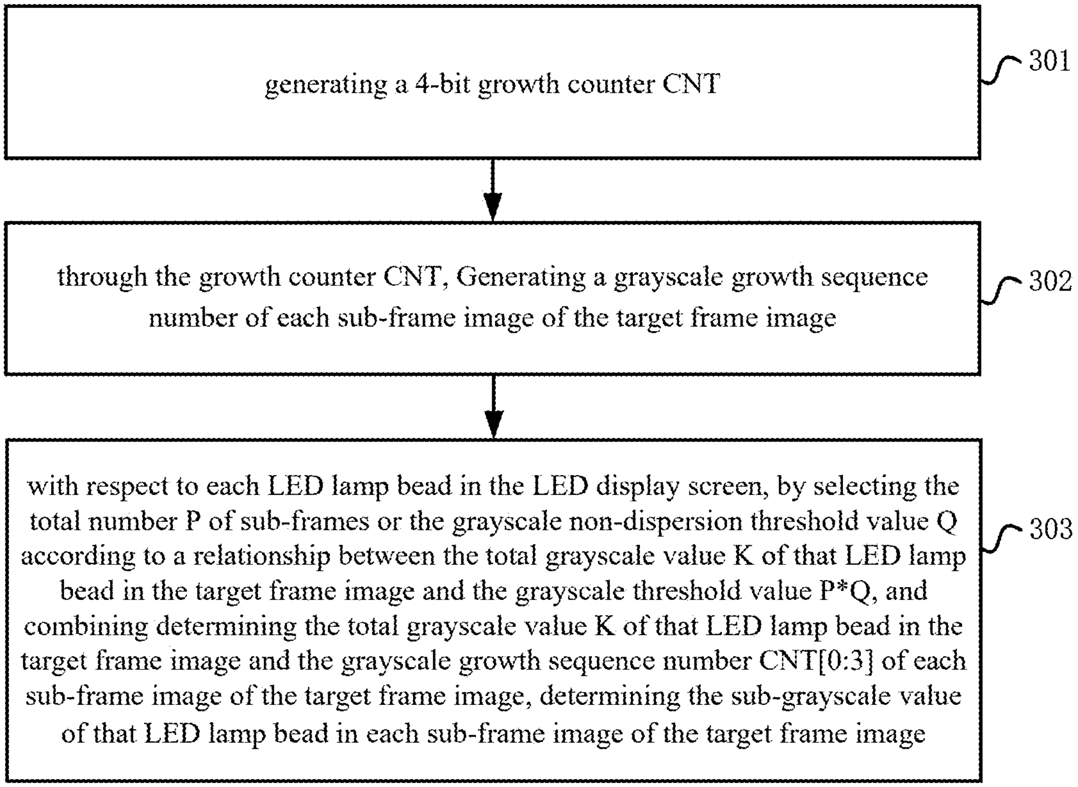
FIG. 3*a* is a flowchart diagram showing another method for driving an LED display screen according to an embodiment of the present disclosure.

The method for driving the LED display screen according to an embodiment of the present disclosure will be further described in detail by taking "the grayscale non-dispersion threshold value Q is equal to 4, the total number P of the sub-frames of each target frame image is equal to 12, the binary bit number N of the binary number '1100' of M=P−1=11 is equal to 4, and the sub-frame counter and the growth counter are 4-bit counters (N=4)" as an example, as shown in FIG. 3A. A specific process of the method for driving the LED display screen according to the embodiment of the present disclosure may include following steps:

In step 301: a 4-bit growth counter CNT is generated.

In step 302: through the growth counter CNT, a grayscale growth sequence number of each sub-frame image of the target frame image is generated.

Figure 3B:
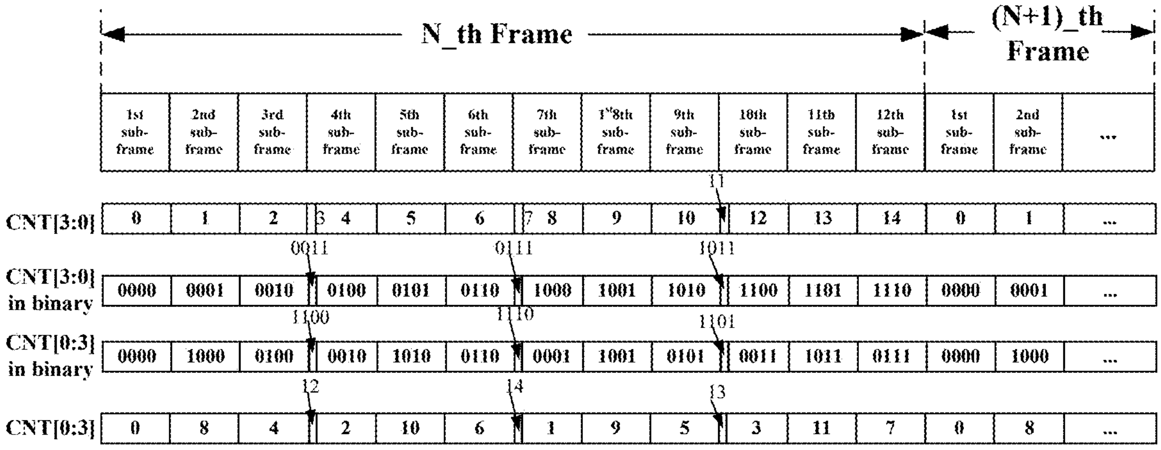
FIG. 3*b* is a schematic diagram showing a variation pattern of the grayscale growth sequence numbers generated by a growth counter according to an embodiment of the present disclosure.

As shown in FIG. 3B, in each sub-frame image of the target frame image, the counted value CNT[3:0] generated by the growth counter CNT changes according to the following rule:

At a beginning of a first sub-frame image, the sub-frame sequence number of the first sub-frame image can be expressed as CNT[3:0]=0 (in decimal)='0000' ((in binary), and the mirrored sub-frame sequence number of the first sub-frame image can be expressed as CNT[0:3]='000' (in binary)=0 (in decimal); since 0<P, in the first sub-frame image, CNT does not change in the current sub-frame image after becoming 0, thus, the grayscale growth sequence number CNT[0:3] of the first sub-frame image is 0.

At a beginning of a second sub-frame image, the sub-frame sequence number of the second sub-frame image can be expressed as CNT[3:0]=0+1=1 (in decimal)='0001' (in binary), and the mirrored sub-frame sequence number of the second sub-frame image can be expressed as CNT[0:3]='1000' (in binary)=8 (in decimal); since 8<P, in the second sub-frame image, CNT does not change in the current sub-frame image after becoming 1, thus, the grayscale growth sequence number CNT[0:3] of the second sub-frame image is 8.

At a beginning of a third sub-frame image, the sub-frame sequence number of the third sub-frame image can be expressed as CNT[3:0]=1+1=2 (in decimal)='0010' (in binary), and the mirrored sub-frame sequence number of the third sub-frame image can be expressed as CNT[0:3]='0100' (in binary)=4 (in decimal); since 4<P, in the third sub-frame image, CNT does not change in the current sub-frame image after becoming 2, thus, the grayscale growth sequence number CNT[0:3] of the third sub-frame image is 4.

At a beginning of a fourth sub-frame image, the sub-frame sequence number of the fourth sub-frame image can be expressed as CNT[3:0]=2+1=3 (in decimal)='0011' (in binary), and the mirrored sub-frame sequence number of the fourth sub-frame image can be expressed as CNT[0:3]='1100' (in binary)=12 (in decimal); since 12≥P, CNT needs to be incremented by 1 again, so that CNT=3+1=4, that is, the intermediate sub-frame sequence number of the fourth sub-frame image can be expressed as CNT[3:0]=4 (in decimal)='0100' (in binary), and the mirrored sub-frame sequence number can be expresses as CNT[0:3]='0010' (in binary)=2 (in decimal); since 2<P, CNT does not change in the current sub-frame image after becoming 4, thus, the grayscale growth sequence number CNT[0:3] of the fourth sub-frame image is 2.

At a beginning of a fifth sub-frame image, the sub-frame sequence number of the fifth sub-frame image can be expressed as CNT[3:0]=4+1=5 (in decimal)='0101' (in binary), and the mirrored sub-frame sequence number of the fifth sub-frame image can be expressed as CNT[0:3]='1010' (in binary)=10 (in decimal); since 10<P, in the fifth sub-frame image, CNT does not change in the current sub-frame after becoming 5, thus, the grayscale growth sequence number CNT[0:3] of the fifth sub-frame image is 10.

At a beginning of a sixth sub-frame image, the sub-frame sequence number of the sixth sub-frame image can be expressed as CNT[3:0]=5+1=6 (in decimal)='0110' (in binary), and the mirrored sub-frame sequence number of the sixth sub-frame image can be expressed as CNT[0:3]='0110' (in binary)=6 (in decimal); since 6<P, in the sixth sub-frame image, CNT does not change in the current sub-frame image after becoming 6, thus, the grayscale growth sequence number CNT[0:3] of the sixth sub-frame image is 6.

At a beginning of a seventh sub-frame image, the sub-frame sequence number of the seventh sub-frame image can be expressed as CNT[3:0]=6+1=7 (in decimal)='0111' (in binary), and the mirrored sub-frame sequence number of the seventh sub-frame image can be expressed as CNT[0:3]='1110' (in binary)=14 (in decimal); since 14>P, in the seventh sub-frame image, CNT still needs to be incremented by 1 again, so that CNT=7+1=8, that is, the intermediate sub-frame sequence number of the seventh sub-frame image can be expressed as CNT[3:0]=8 (in decimal)='1000' (in binary), and the mirrored sub-frame sequence number can be expressed as CNT[0:3]='0001' (in binary)=1 (in decimal); since 1<P, CNT does not change in the current sub-frame image, thus, the grayscale growth sequence number CNT[0:3] of the seventh sub-frame image is 1.

At a beginning of an eighth sub-frame image, the sub-frame sequence number of the eighth sub-frame image can be expressed as CNT[3:0]=8+1=9 (in decimal)='1001' (in binary), and the mirrored sub-frame sequence number of the eighth sub-frame image can be expressed as CNT[0:3]='1001' (in binary)=9 (in decimal); since 9<P, in the eighth sub-frame image, CNT does not change in the current sub-frame image after becoming 9, thus, the grayscale growth sequence number CNT[0:3] of the eighth sub-frame image is 9.

At a beginning of a ninth sub-frame image, the sub-frame sequence number of the ninth sub-frame image can be expressed as CNT[3:0]=9+1=10 (in decimal)='1010' (in binary), and the mirrored sub-frame sequence number of the ninth sub-frame image can be expressed as CNT[0:3]='0101' (in binary)=5 (in decimal); since 5<P, in the ninth sub-frame image, CNT does not change in the current sub-frame image after becoming 10, thus, the grayscale growth sequence number CNT[0:3] of the ninth sub-frame image is 5.

At a beginning of a tenth sub-frame image, the sub-frame sequence number of the tenth sub-frame image can be expressed as CNT[3:0]=10+1=11 (in decimal)='1011' (in binary), and the mirrored sub-frame sequence number of the tenth sub-frame image can be expressed as CNT[0:3]='1101' (in binary)=13 (in decimal); since 13≥P, in the tenth sub-frame image, CNT needs to be incremented by 1 again, so that CNT=11+1=12, that is, the intermediate sub-frame sequence number of the tenth sub-frame image can be expressed as CNT[3:0]=12 (in decimal)='1100' (in binary), and the mirrored sub-frame sequence number can be expressed as CNT[0:3]='0011' (in binary)=3 (in decimal); since 3<P, therefore, CNT does not change in the current sub-frame image after becoming 12, that is, the grayscale growth sequence number CNT[0:3] of the tenth sub-frame image is 3.

At a beginning of an eleventh sub-frame image, the sub-frame sequence number of the eleventh sub-frame image can be expressed as CNT[3:0]=12+1=13 (in decimal)= '1101' (in binary), and the mirrored sub-frame sequence number of the eleventh sub-frame image can be expressed as CNT[0:3]='1011' (in binary)=11 (in decimal); since 11<P, in the eleventh sub-frame image, CNT does not change in the current sub-frame image after becoming 13, thus, the grayscale growth sequence number CNT[0:3] of the eleventh sub-frame image is 11.

At a beginning of a twelfth sub-frame image, the sub-frame sequence number of the twelfth sub-frame image can be expressed as CNT[3:0]=13+1=14 (in decimal)='1110' (in binary), and the mirrored sub-frame sequence number of the twelfth sub-frame image can be expressed as CNT[0:3]= '0111' (in binary)=7 (in decimal); since 7<P, in the twelfth sub-frame image, CNT does not change in the current sub-frame image after becoming 14, thus, the grayscale growth sequence number CNT[0:3] of the twelfth sub-frame image is 7.

In step 303, with respect to each LED lamp bead in the LED display screen, by selecting the total number P of sub-frames or the grayscale non-dispersion threshold value Q according to a relationship between the total grayscale value K of that LED lamp bead in the target frame image and the grayscale threshold value P*Q, and combining determining the total grayscale value K of that LED lamp bead in the target frame image and the grayscale growth sequence number CNT[0:3] of each sub-frame image of the target frame image, the sub-grayscale value of that LED lamp bead in each sub-frame image of the target frame image is determined.

For example, when the total grayscale value of a certain LED lamp bead in the LED display screen in the target frame image is K=68, since K>P*Q, then K/P=68/12 is calculated to obtain a first quotient value J=5 and a first remainder L=8. After comparing the first remainder L with the grayscale growth sequence number CNT[0:3] of each sub-frame image of the target frame image, as shown in Table 1, each sub-grayscale value of the second frame image, the fifth frame image, the eighth frame image, and the eleventh sub-frame image is 5, and each sub-grayscale value of other sub-frame images is 6, that is, the sub-grayscale values of three adjacent sub-frame images are "6, 5, 6", respectively, thus realizing uniform dispersion of the total grayscale value, effectively avoiding the problem of abnormal image display caused by grayscale uneven dispersion within each frame.

TABLE 1

| | sub-frame sequence number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| CNT[3:0] in decimal | 0 | 1 | 2 | 4 | 5 | 6 | 8 | 9 | 10 | 12 | 13 | 14 |
| CNT[3:0] in binary | 0000 | 0001 | 0010 | 0100 | 0101 | 0110 | 1000 | 1001 | 1010 | 1100 | 1101 | 1110 |
| CNT[0:3] in binary | 0000 | 1000 | 0100 | 0010 | 1010 | 0110 | 0001 | 1001 | 0101 | 0011 | 1011 | 0111 |
| CNT[0:3] in decimal | 0 | 8 | 4 | 2 | 10 | 6 | 1 | 9 | 5 | 3 | 11 | 7 |
| L vs. CNT[0:3] | L > 0 | L ≤ 8 | L > 4 | L > 2 | L ≤ 10 | L > 6 | L > 1 | L ≤ 9 | L > 5 | L > 3 | L ≤ 11 | L > 7 |
| sub-grayscale value | 6 | 5 | 6 | 6 | 5 | 6 | 6 | 5 | 6 | 6 | 5 | 6 |

In another example, when the total grayscale value K of a certain LED lamp bead in the LED display screen in the target frame image is 19, since K≤P*Q, then K/Q=19/4 is calculated to obtain a second quotient value S=4 and a second remainder T=3, and after the second quotient value S is compared with the grayscale growth sequence number CNT[0:3] of each sub-frame image of the target frame image, respectively, as shown in Table 2, each sub-grayscale value of the first sub-frame image, the fourth sub-frame image, the seventh sub-frame image, and the tenth sub-frame image is 4, the sub-grayscale value of the third sub-frame image is 3, and each sub-grayscale value of the other sub-frame images is 0.

TABLE 2

| | sub-frame sequence number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| CNT[3:0] in decimal | 0 | 1 | 2 | 4 | 5 | 6 | 8 | 9 | 10 | 12 | 13 | 14 |
| CNT[3:0] in binary | 0000 | 0001 | 0010 | 0100 | 0101 | 0110 | 1000 | 1001 | 1010 | 1100 | 1101 | 1110 |
| CNT[0:3] in binary | 0000 | 1000 | 0100 | 0010 | 1010 | 0110 | 0001 | 1001 | 0101 | 0011 | 1011 | 0111 |
| CNT[0:3] in decimal | 0 | 8 | 4 | 2 | 10 | 6 | 1 | 9 | 5 | 3 | 11 | 7 |
| S vs. CNT[0:3] | S > 0 | S < 8 | S = 4 | S > 2 | S < 10 | S < 6 | S > 1 | S < 9 | S < 5 | S > 3 | S < 11 | S < 7 |
| sub-grayscale value | 4 | 0 | 3 | 4 | 0 | 0 | 4 | 0 | 0 | 4 | 0 | 0 |

It can be seen that in this example, if four sub-frame images with the sub-grayscale value of 4 are all concentrated as the first to fourth sub-frame images, then the LED lamp bead is turned off during a period of the fifth to twelfth sub-frame images, that is, the LED lamp bead is not bright, and if this dark period exceeds the visual persistence threshold of human eyes, the human eyes can perceive flickering images with alternating brightness and darkness. However, in the method for driving the LED display screen according to an embodiment of the present disclosure, referring to Table 1, it can be known that time intervals among the four sub-frame images with the sub-grayscale value of 4 in the 12 sub-frame images are equal and each correspond to a period for displaying 2 sub-frame images, thus realizing uniform dispersion of the total grayscale value, so that and the problem of abnormal image display caused by the uneven grayscale dispersion within each frame can be effectively avoided. Moreover, the method for driving the LED display screen provided according to the embodiments of the present disclosure is very easy to be implemented using hardware or software, such as chips or FPGAs, and has good universality (i.e., suitable for any grayscale value and any number of sub-frames from 1 to 512), thereby reducing the research and development cost and the implementation cost. From an engineering perspective, this method for driving the LED display screen has high industrial value and requires minimal hardware overhead.

Figure 4:
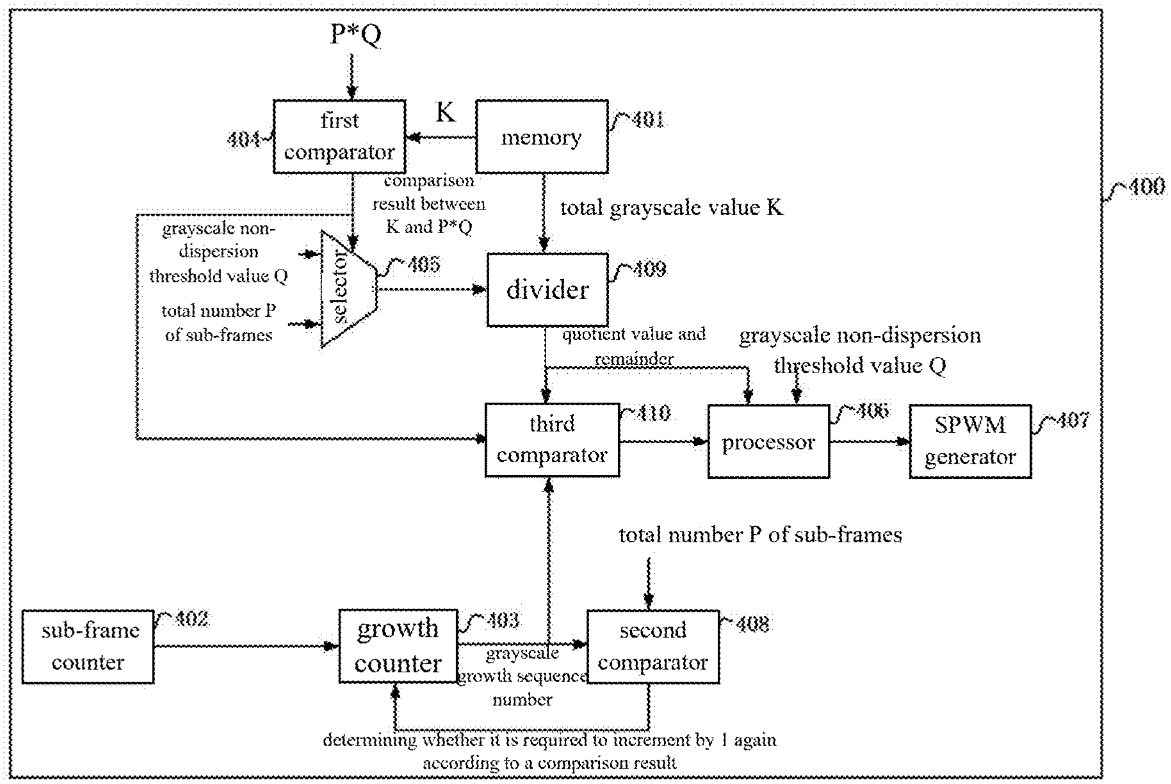
FIG. 4 is a schematic block diagram of a system for driving an LED display screen according to an embodiment of the present disclosure.

According to the above embodiments, the present disclosure further provides a system for driving an LED display screen. Referring to FIG. 4, the system 400 for driving the LED display screen provided according to an embodiment of the present disclosure at least includes: a memory 401, a sub-frame counter 402, a growth counter 403, a first comparator 404, a selector 405, a processor 406, and an SPWM generator 407.

The memory 401 is configured to store the grayscale non-dispersion threshold value, the total number of sub-frames of the target frame image, and the total grayscale value of each LED lamp bead in the LED display screen in the target frame image.

The sub-frame counter 402 is configured to generate the sub-frame sequence number of each sub-frame image of the target frame image.

The growth counter 403 is configured to generate the grayscale growth sequence number representing the grayscale allocation priority corresponding to each sub-frame image of the target frame image, according to the sub-frame sequence number of each sub-frame image of the target frame image.

The first comparator 404 is configured to compare the total grayscale value of each LED lamp bead in the target frame stored in the memory 401 with the grayscale threshold value, and output a corresponding comparison result for each LED lamp bead.

The selector 405 is configured to select one of the grayscale non-dispersion threshold value and the total number of sub-frames stored in the memory 401 according to the comparison result for each LED lamp bead output by the comparator 404, and output a corresponding selection result for each LED lamp bead.

The processor 406 is configured to, according to the selection result for each LED lamp bead output by the selector 405, the grayscale growth sequence number of each sub-frame image of the target frame image generated by the growth counter 403 and the total grayscale value of each LED lamp bead in the target frame image stored in the memory 401, determine a sub-grayscale value of each LED lamp bead in each sub-frame image of the target frame image.

The SPWM generator 407 is configured to generate the SPWM pulse for each LED lamp bead in each sub-frame image of the target frame image according to the sub-grayscale value of each LED lamp bead in each sub-frame image of the target frame image, so as to drive the LED display screen to sequentially display each sub-frame image of the target frame image.

In an optional implementation, the processor 406 is further configured to determine a product of the grayscale non-dispersion threshold value and the total number of sub-frames as the grayscale threshold value; wherein, the total number of sub-frames may be any natural number selected from 1 to 512, the grayscale non-dispersion threshold value is a natural number greater than 1 when the non-dispersion mode at low grayscale is enabled, and the grayscale non-dispersion threshold value is 1 when the non-dispersion mode at low grayscale is not enabled.

In an optional embodiment, the growth counter 403 is specifically configured to, for each sub-frame image of the target frame image, perform a high-low bit flip operation on the binary number of the sub-frame sequence number of that sub-frame image to obtain the mirrored sub-frame sequence number of that sub-frame image, and determine the grayscale growth sequence number of that sub-frame image according to the mirrored sub-frame sequence number of that sub-frame image.

In an optional embodiment, the growth counter 403 is specifically configured to determine the mirrored sub-frame sequence number of the sub-frame image as the grayscale growth sequence number of the sub-frame image if the second comparator 408 determines that the mirrored sub-frame sequence number of the sub-frame image is less than the total number of sub-frames, and if the second comparator 408 determines that the mirrored sub-frame sequence number of the sub-frame image is not less than the total number of sub-frames, the growth counter 403 is configured to iteratively perform sequence number increment operation on the sub-frame sequence number of the sub-frame image until the second comparator 408 determines that the mirrored sub-frame sequence number of the intermediate sub-frame sequence number obtained by the sequence number increment operation is less than the total number of the sub-frames, and the mirrored sub-frame sequence number of the intermediate sub-frame sequence number obtained from the sequence number increment operation performed for the last time is determined as the grayscale growth sequence number of the sub-frame image, wherein the sequence number increment operation includes: incrementing by a first value.

In an optional implementation, the system 400 for driving the LED display screen provided according to an embodiment of the present disclosure may further include:

a divider 409, configured to, for each LED lamp bead in the LED display screen, perform a division operation on the total grayscale value of that LED lamp bead in the target frame image and the total number of sub-frames of the target frame image, to obtain and output a first quotient value and a first remainder; or, for each LED lamp bead in the LED display screen, perform a division operation on the total grayscale value of that LED lamp bead in the target frame image and the grayscale non-dispersion threshold value to obtain and output a second quotient value and a second remainder.

In an optional implementation, the processor 406 is further configured to: for each sub-frame image of the target frame image, set the sub-grayscale value of the LED lamp bead in the sub-frame image to a sum of the first quotient value and the second value if the third comparator 410 determines that the first remainder is greater than the grayscale growth sequence number of the sub-frame image, and set the sub-grayscale value of the LED lamp bead in the sub-frame image to the first quotient value if the third comparator 410 determines that the first remainder is not greater than the grayscale growth sequence number of the sub-frame image; or, for each sub-frame image of the target frame image, set the sub-grayscale value of the LED lamp bead in the sub-frame image to the grayscale non-dispersion threshold value if the third comparator 410 determines that the second quotient value is greater than the grayscale growth sequence number of the sub-frame image, and set the sub-grayscale value of the LED lamp bead in the sub-frame image to the second remainder if the third comparator 410 determines that the second quotient value is equal to the grayscale growth sequence number of the sub-frame image; and if the third comparator 410 determines that the second quotient value is less than the grayscale growth sequence number of the sub-frame image, set the sub-grayscale value of the LED lamp bead in the sub-frame image to be 0.

Figure 5:
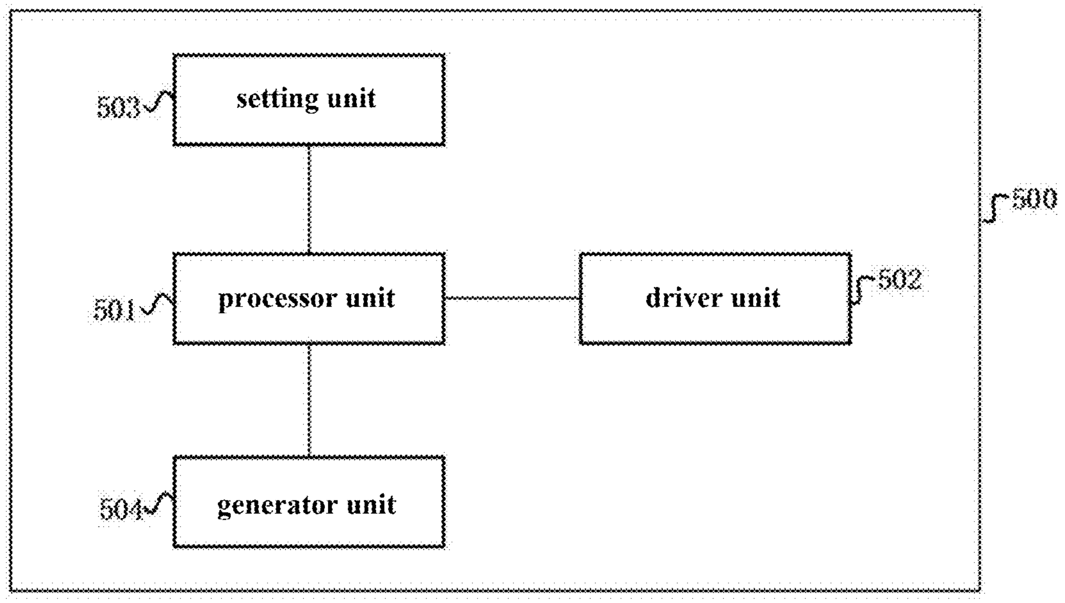
FIG. 5 is a schematic diagram showing a functional structure of a system for driving an LED display screen according to an embodiment of the present disclosure.

Based on the above embodiments, a device for driving an LED display screen is further provided according to an embodiment of the present disclosure. Referring to FIG. 5, the device 500 for driving the LED display screen provided according to the embodiment of the present disclosure at least includes: a processor unit 501 and a driver unit 502.

The processor unit 501 is configured to, for each LED lamp bead in the LED display screen: if it is determined that the total grayscale value of the LED lamp bead in the target frame image is greater than the grayscale threshold value, determine the sub-grayscale value of that LED lamp bead in each sub-frame image of the target frame image according to the total grayscale value of the LED lamp bead in the target frame image, the total number of sub-frames of the target frame image, and the grayscale growth sequence number of each sub-frame image of the target frame image; if it is determined that the total grayscale value of the LED lamp bead in the target frame image is not greater than the grayscale threshold value, determine the sub-grayscale value of that LED lamp bead in each sub-frame image of the target frame image according to the total grayscale value of that LED lamp bead in the target frame image, the grayscale non-dispersion threshold value and the grayscale growth sequence number of each sub-frame image of the target frame image; wherein the grayscale growth sequence number of each sub-frame image is a parameter which is determined according to the sub-frame sequence number of that sub-frame image and represents the grayscale allocation priority of that sub-frame image.

The driver unit 502 is configured to drive the LED display screen to sequentially display each sub-frame image of the target frame image according to the sub-grayscale value of each LED lamp bead in the LED display screen in that sub-frame image of the target frame image.

In an optional implementation, the device 500 for driving the LED display screen provided according to the embodiment of the present disclosure further includes:

a setting unit 503, configured to determine a product of the grayscale non-dispersion threshold value and the total number of sub-frames as the grayscale threshold value; wherein, the total number of sub-frames can be any natural number from 1 to 512, the grayscale non-dispersion threshold value is a natural number greater than 1 when the non-dispersion mode at low grayscale is enabled, and the grayscale non-dispersion threshold value is 1 when the non-dispersion mode at low grayscale is not enabled.

In an optional implementation, the device 500 for driving the LED display screen according to the embodiment of the present disclosure further includes:

a generator unit 504, which is configured to, for each sub-frame image of the target frame image, perform a high-low bit flip operation on the binary number of the sub-frame sequence number of that sub-frame image to obtain the mirrored sub-frame sequence number of that sub-frame image, and determine the grayscale growth sequence number of that sub-frame image according to the mirrored sub-frame sequence number of that sub-frame image.

In an optional implementation, when determining the grayscale growth sequence number of the sub-frame image according to the corresponding mirrored sub-frame sequence number of that sub-frame image, the generator unit 504 may be specifically configured to:

if it is determined that the mirrored sub-frame sequence number of the sub-frame image is less than the total number of the sub-frames, set the mirrored sub-frame sequence number of the sub-frame image as the grayscale growth sequence number of the sub-frame image; if it is determined that the mirrored sub-frame sequence number of the sub-frame image is not less than the total number of the sub-frames, iteratively perform a sequence number increment operation on the sub-frame sequence number of the sub-frame image, and until it is determined that the mirrored sub-frame sequence number of an intermediate sub-frame sequence number obtained by the sequence number increment operation is less than the total number of the sub-frames, determine the mirrored sub-frame sequence number of the intermediate sub-frame sequence number obtained from the sequence number increment operation performed for the last time as the grayscale growth sequence number of the sub-frame image; wherein the sequence number increment operation comprises: incrementing by a first value.

In an optional implementation, when determining the sub-grayscale value of the LED lamp bead in each sub-frame image of the target frame image according to the total grayscale value of the LED lamp bead in the target frame image, the total number of sub-frames of the target frame image, and the grayscale growth sequence number of each sub-frame image of the target frame image, the processor unit 501 is specifically configured to:

perform a division operation on the total grayscale value of the LED lamp bead in the target frame image and the total number of the sub-frames of the target frame image to obtain a first quotient value and a first remainder;

for each sub-frame image of the target frame image, if it is determined that the first remainder is greater than the grayscale growth sequence number of that sub-frame image, set the sub-grayscale value of the LED lamp bead in that sub-frame image to a sum of the first quotient value and the second value; if it is determined that the first remainder is not greater than the grayscale growth sequence number of that sub-frame image, set the sub-grayscale value of the LED lamp bead in that sub-frame image to the first quotient value.

In an optional implementation, when determining the sub-grayscale value of the LED lamp bead in each sub-frame image of the target frame image according to the total grayscale value of the LED lamp bead in the target frame image, the grayscale non-dispersion threshold value and the grayscale growth sequence number of each sub-frame image of the target frame image, the processor unit 501 is specifically configured to:

perform a division operation on the total grayscale value of the LED lamp bead in the target frame image and the grayscale non-dispersion threshold value to obtain a second quotient value and a second remainder;

for each sub-frame image of the target frame image, if the second quotient value is determined to be greater than the grayscale growth sequence number of the sub-frame image, set the sub-grayscale value of the LED lamp bead in the sub-frame image to the grayscale non-dispersion threshold value, and if the second quotient value is determined to be equal to the grayscale growth sequence number of the sub-frame image, set the sub-grayscale value of the LED lamp bead in the sub-frame image to the second remainder; and if the second quotient value is determined to be less than the grayscale growth sequence number of the sub-frame image, set the sub-grayscale value of the LED lamp bead in the sub-frame image to 0.

It should be noted that the principle for solving the technical problem by the device 500 for driving the LED display screen provided in the embodiments of the present disclosure is similar to that of the method for driving the LED display screen provided in the embodiments of the present disclosure. Therefore, the implementations of the device 500 for driving the LED display screen provided in the embodiments of the present disclosure can refer to the implementations of the method for driving the LED display screen provided in the embodiments of the present disclosure, same points will not be repeated.

After the method, the system and the device for driving the LED display screen are introduced according to the embodiments of the present disclosure, an electronic device according to embodiments of the present disclosure will be briefly introduced as follows.

Figure 6:
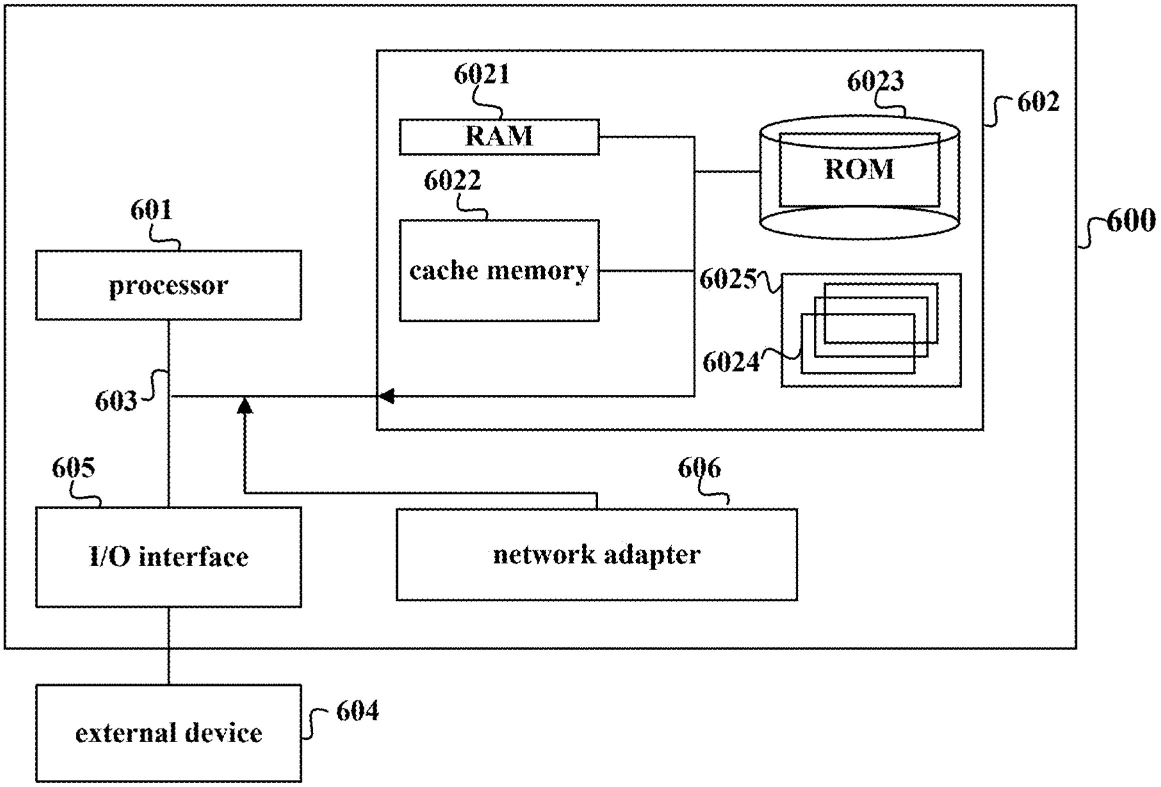
FIG. 6 is a schematic diagram showing a hardware structure of an electronic device according to an embodiment of the present disclosure.

Referring to FIG. 6, an electronic device 600 provided according to an embodiment of the present disclosure at least includes a processor 601, a memory 602, and a computer program which is stored in the memory 602 and executable by the processor 601. When the computer program is executed by the processor 601, the method for driving the LED display screen provided according to embodiments of the present application can be implemented.

The electronic device 600 provided according to an embodiment of the present disclosure may further include a bus 603 connecting different components (including the processor 601 and the memory 602). The bus 603 represents one or more of several types of bus structures, including a memory bus, a peripheral bus, a local bus, and the like.

The memory 602 may include a readable medium in a form of volatile memory such as random access memory (RAM) 6021, and/or a cache memory 6022, and may further include a read only memory (ROM) 6023.

The memory 602 may also include program tools 6025 including a set (or at least one) of program modules 6024. The program modules include, but not limited to, an operational subsystem, one or more application programs, other program modules, and program data, each of which, or some combination thereof, may include an implementation of a networked environment.

The processor 601 may be a processor, or may be collectively referred to as a plurality of processing elements. For example, the processor 601 may be a central processing unit (CPU), or one or more integrated circuits configured to implement the above method for driving the LED display screen. In particular, the processor 601 may be a general-purpose processor including, but not limited to, a CPU, an application specific integrated circuit (ASIC), field programmable gate array (FPGA) or other programmable logic device, discrete gate or transistor logic device, discrete hardware component, or the like.

The electronic device 600 may also be in communication with one or more external devices 604 (e.g., a keyboard, a remote control, etc.), and may also communicate with one or more devices that enable a user to interact with the electronic device 600 (e.g., a cell phone, a computer, etc.), and/or, communicate with any device (e.g., router, modem, etc.) that enables the electronic device 600 to communicate with one or more other electronic devices 600. Those kinds of communication may occur through an input/output (I/O) interface 605. In addition, the electronic device 600 can also communicate with one or more networks (e.g., a local area network (LAN), a wide area network (WAN), and/or a public network, such as the Internet) via a network adapter 606. As shown in FIG. 6, the network adapter 606 can communicate with other modules of the electronic device 600 via the bus 603. It should be understood that although not shown in FIG. 6, other hardware and/or software module, including, but not limited to, microcode, a device driver, a redundant processor, an external disk drive array, a subsystem of disk array (e.g., redundant arrays of independent disks, RAID), a tape drive, and a data backup storage subsystem, may be used in conjunction with the electronic device 600.

As an example, the electronic device according to the embodiments of the present disclosure may include, but not limited to, a desktop computer, a television, and a mobile device with a large screen, such as a mobile phone, a tablet computer, and other common electronic devices that require multiple chips to be connected in cascade for driving.

The electronic device can also be a user equipment (UE), a mobile device, a user terminal, a terminal, a handheld device, a computing device, or a vehicle-mounted device, etc. Examples of the terminal may include a display, a smart phone or a portable device, a mobile phone, a tablet computer, a notebook computer, a palmtop computer, a mobile Internet device (MID), a wearable device, and a virtual reality (VR) device, an augmented reality (AR) device, a wireless terminal for industrial control, a wireless terminal for self-driving, a wireless terminal for remote medical surgery, a wireless terminal for smart grid, a wireless terminal for transportation safety, a wireless terminal for smart city, a wireless terminal for smart home, a wireless terminal for Internet of vehicles, etc.

It should be noted that the electronic device 600 shown in FIG. 6 is only an example, and should not bring any limitation to the functions and the usage scope of the embodiments of the present application.

A display driving device according to an embodiment of the present application is introduced as follows. In an embodiment of the present disclosure, the display driving device may include the LED driver IC described above in the embodiments of the present disclosure, and the display driving device may be used to execute, by the LED driver IC, the method for driving the LED display screen provided according to the embodiments of the present disclosure.

In addition, the present application disclosure also provides a readable storage medium, which may store program instructions, and when the program instructions are executed by a processor, the method for driving the LED display screen according to any of the embodiments of the present disclosure can be realized. Specifically, the program instructions may be built in or installed in the processor, so that the processor may implement the method for driving the LED display screen provided according to any of the embodiments of the present disclosure by executing the built-in or installed program instructions.

The readable storage medium provide by embodiments of the present disclosure may be, but is not limited to, a system, a device or an apparatus using electronic, magnetic, optical, electromagnetic, infrared, or semiconductor technology, or any combination thereof, specifically, more specific examples (non-exhaustive) of the readable storage medium would include an electrical connection having one or more wires, a portable disk, a hard disk, a RAM, a ROM, an erasable programmable read-only memory (EPROM), an optical fiber, a portable compact disc read-only memory (CD-ROM), an optical storage device, a magnetic storage device, or any suitable combination of the foregoing.

It should be noted that although several units or sub-units of the device are mentioned in the detailed description above, such division is merely exemplary and not mandatory. In fact, according to the implementation of the present application, the features and functions of two or more units described above may be embodied in a single unit. Conversely, the features and functions of a single unit described above may be further divided and embodied by multiple units.

Furthermore, although operations of the method according to the present application are described in a specific order in the accompanying drawings, these do not require or imply that the operations must be performed in that particular order, or that all the shown operations must be executed to achieve the desired results. Additionally or alternatively, certain steps may be omitted, multiple steps may be combined into a single step for execution, and/or a single step may be broken down into multiple steps for execution.

Although some preferred embodiments of the present application have been described, those skilled in the art, once informed of the basic inventive concept, may make additional changes and modifications to these embodiments. Therefore, the appended claims are intended to encompass the preferred embodiments as well as all changes and modifications that fall within the scope of the present application.

It is evident that those skilled in the art may make various modifications and variations to the embodiments of the present application without departing from the spirit and scope of the present application. Therefore, if such modifications and variations of the embodiments fall within the scope of the claims and their equivalent technologies of the present application, the present application is intended to include these modifications and variations as well.

The invention claimed is:

1. A method for driving an LED display screen, comprising:

for each LED lamp bead in the LED display screen, if it is determined that a total grayscale value of that LED lamp bead in a target frame image is greater than a grayscale threshold value, determining a sub-grayscale value of that LED lamp bead in each sub-frame image of the target frame image according to the total grayscale value of that LED lamp bead in the target frame image, a total number of sub-frames of the target frame image and a grayscale growth sequence number of each sub-frame image of the target frame image; if it is determined that the total grayscale value of the LED lamp bead in the target frame image is not greater than the grayscale threshold value, determining the sub-grayscale value of that LED lamp bead in each sub-frame image of the target frame image according to the total grayscale value of that LED lamp bead in the target frame image, a grayscale non-dispersion threshold value and the grayscale growth sequence number of each sub-frame image of the target frame image; wherein the grayscale growth sequence number of each sub-frame image is a parameter which is determined according to a sub-frame sequence number of that sub-frame image and represents grayscale allocation priority of the sub-frame image; and driving the LED display screen to sequentially display each sub-frame image of the target frame image according to the sub-grayscale value of each LED lamp bead in the LED display screen in each sub-frame image of the target frame image, wherein the method for driving the LED display screen further comprises:

determining a product of the grayscale non-dispersion threshold value and the total number of the sub-frames as the grayscale threshold value, wherein the total number of the sub-frames is a natural number selected from 1 to 512; the grayscale non-dispersion threshold value is a natural number greater than 1 when a non-dispersion mode at low grayscale is enabled, and the grayscale non-dispersion threshold value is equal to 1 when the non-dispersion mode at low grayscale is not enabled.

2. The method for driving the LED display screen according to claim 1, further comprising:

for each sub-frame image of the target frame image, performing high-low bit flip operation on a binary number of the sub-frame sequence number of that sub-frame image to obtain a mirrored sub-frame sequence number of that sub-frame image, and determining the grayscale growth sequence number of that sub-frame image according to the mirrored sub-frame sequence number of that sub-frame image.

3. The method for driving the LED display screen according to claim 2, wherein determining the grayscale growth sequence number of the sub-frame image according to the mirrored sub-frame sequence number of the sub-frame image comprises:

if it is determined that the mirrored sub-frame sequence number of the sub-frame image is less than the total number of the sub-frames, determining the mirrored sub-frame sequence number of the sub-frame image as the grayscale growth sequence number of the sub-frame image; if it is determined that the mirrored sub-frame sequence number of the sub-frame image is not less than the total number of the sub-frames, iteratively performing a sequence number increment operation on the sub-frame sequence number of the sub-frame image, until it is determined that the mirrored sub-frame sequence number of an intermediate sub-frame sequence number obtained by performing the sequence number increment operation is less than the total number of the sub-frames, determining the mirrored sub-frame sequence number of the intermediate sub-frame sequence number obtained from the sequence number increment operation performed for a last time as the grayscale growth sequence number of the sub-frame image; wherein the sequence number increment operation comprises: incrementing by a first value.

4. The method for driving the LED display screen according to claim 1, wherein determining the sub-grayscale value of the LED lamp bead in each sub-frame image of the target frame image according to the total grayscale value of the LED lamp bead in the target frame image, the total number of the sub-frames of the target frame image, and the grayscale growth sequence number of each sub-frame image of the target frame image, comprises:

performing a division operation on the total grayscale value of the LED lamp bead in the target frame image and the total number of the sub-frames of the target frame image to obtain a first quotient value and a first remainder;

for each sub-frame image of the target frame image, if it is determined that the first remainder is greater than the grayscale growth sequence number of the sub-frame image, setting the sub-grayscale value of the LED lamp bead in the sub-frame image to a sum of the first quotient value and a second value; if it is determined that the first remainder is not greater than the grayscale growth sequence number of the sub-frame image, setting the sub-grayscale value of the LED lamp bead in the sub-frame image to the first quotient value.

5. The method for driving the LED display screen according to claim 1, wherein determining the sub-grayscale value of the LED lamp bead in each sub-frame image of the target frame image according to the total grayscale value of the LED lamp bead in the target frame image, the grayscale non-dispersion threshold value and the grayscale growth sequence number of each sub-frame image of the target frame image comprises:

performing a division operation on the total grayscale value of the LED lamp bead in the target frame image and the grayscale non-dispersion threshold value to obtain a second quotient value and a second remainder;

for each sub-frame image of the target frame image, if it is determined that the second quotient value is greater than the grayscale growth sequence number of the sub-frame image, setting the sub-grayscale value of the LED lamp bead in the sub-frame image to the grayscale non-dispersion threshold value; if it is determined that the second quotient value is equal to the grayscale growth sequence number of the sub-frame image, setting the sub-grayscale value of the LED lamp bead in the sub-frame image to the second remainder; if the second quotient value is determined to be less than the grayscale growth sequence number of the sub-frame image, setting the sub-grayscale value of the LED lamp bead in the sub-frame image to 0.

6. The method for driving the LED display screen according to claim 1, wherein the method is applied to any one of an LED display screen, a micro LED display screen, a mini LED display screen, a quantum dot LED display screen and an organic LED display screen.

7. A system for driving an LED display screen, comprising:

a memory, configured to store a grayscale non-dispersion threshold value, a total number of sub-frames of a target frame image and a total grayscale value of each LED lamp bead in the LED display screen in the target frame image;

a sub-frame counter, configured to generate a sub-frame sequence number of each sub-frame image of the target frame image;

a growth counter, configured to generate a grayscale growth sequence number representing a grayscale allocation priority corresponding to each sub-frame image of the target frame image according to the sub-frame sequence number of each sub-frame image of the target frame image;

a comparator, configured to respectively comparing the total grayscale value of each LED lamp bead stored in the memory in the target frame image with a grayscale threshold value, and output a corresponding comparison result for each LED lamp bead;

a selector, configured to select one of the grayscale non-dispersion threshold value and the total number of the sub-frames stored in the memory according to the corresponding comparison result for each LED lamp bead output by the comparator, and output a corresponding selection result for each LED lamp bead;

a processor, configured to determine a sub-grayscale value of each LED lamp bead in each sub-frame image of the target frame image according to the corresponding selection result output by the selector, the grayscale growth sequence number of each sub-frame image of the target frame image generated by the growth counter and the total grayscale value of each LED lamp bead in the target frame image stored in the memory; and and an SPWM generator, configured to generate an SPWM pulse for each LED lamp bead in each sub-frame image of the target frame image according to the sub-grayscale value of each LED lamp bead in each sub-frame image of the target frame image, so as to drive the LED display screen to sequentially display each sub-frame image of the target frame image, wherein the processor is further configured to determine a product of the grayscale non-dispersion threshold value and the total number of the sub-frames as the grayscale threshold value, and output the grayscale threshold value to the comparator, wherein the total number of the sub-frames is a natural number selected from 1 to 512; the grayscale non-dispersion threshold value is a natural number greater than 1 when a non-dispersion mode at low grayscale is enabled, and the grayscale non-dispersion threshold value is equal to 1 when the non-dispersion mode at low grayscale is not enabled.

8. A device for driving an LED display screen, comprising:

a processor unit, wherein, for each LED lamp bead in the LED display screen, if it is determined that a total grayscale value of that LED lamp bead in a target frame image is greater than a grayscale threshold value, the processor unit is configured to determine a sub-grayscale value of that LED lamp bead in each sub-frame image of the target frame image according to the total grayscale value of that LED light beads in the target frame image, a total number of sub-frames in the target frame image, and a grayscale growth sequence number of each sub-frame image of the target frame image; if it is determined that the total grayscale value of that LED lamp bead in the target frame image is not greater than the grayscale threshold value, the processor unit is configured to determine the sub-grayscale value of that LED lamp bead in each sub-frame image of the target frame image according to the total grayscale value of that LED lamp bead in the target frame image, a grayscale non-dispersion threshold value and the grayscale growth sequence number of each sub-frame image of the target frame image; wherein the grayscale growth sequence number of each sub-frame image is a parameter which is determined according to the sub-frame sequence number of that sub-frame image and represents a grayscale allocation priority of that sub-frame image;

a driver unit, configured to drive the LED display screen to sequentially display each sub-frame image of the target frame image according to the sub-grayscale value of each LED lamp bead in the LED display screen in each sub-frame image of the target frame image, a setting unit, configured to determine a product of the grayscale non-dispersion threshold value and the total number of the sub-frames as the grayscale threshold value, wherein the total number of the sub-frames is a natural number selected from 1 to 512; the grayscale non-dispersion threshold value is a natural number greater than 1 when a non-dispersion mode at low grayscale is enabled, and the grayscale non-dispersion threshold value is equal to 1 when the non-dispersion mode at low grayscale is not enabled.

* * * * *